RECORDING APPARATUS WITH SPACED PIGMENT CARRIER

Filed March 21, 1960 2 Sheets-Sheet 1

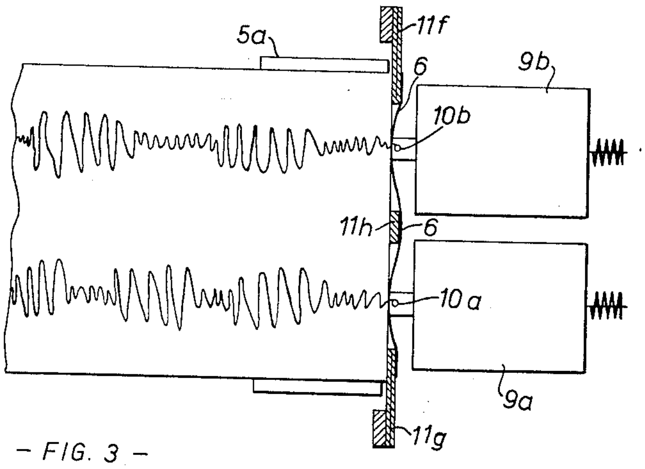
- FIG. 3 -
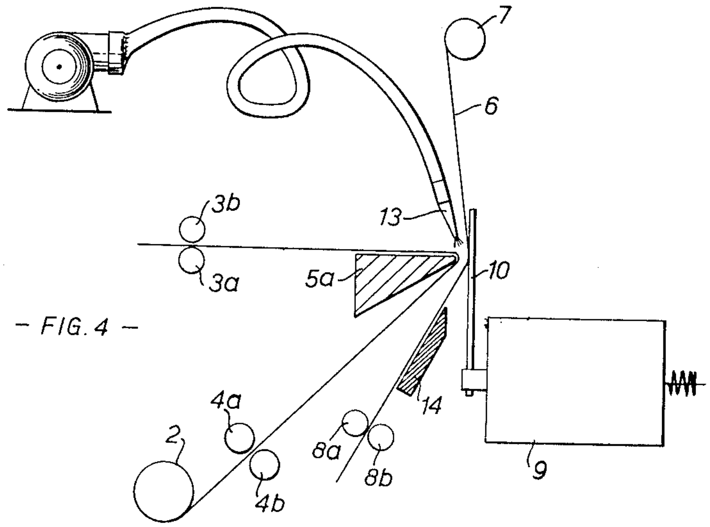
- FIG. 4 -

United States Patent Office 3,090,663
Patented May 21, 1963

3,090,663

RECORDING APPARATUS WITH SPACED PIGMENT CARRIER

Johann Albrecht Schaeder, Merzhausen, near Freiburg im Breisgau, and Benno Streu, Freiburg im Breisgau, Germany, assignors to Fritz Hellige & Co. G.m.b.H., Freiburg im Breisgau, Germany, a German company Filed Mar. 21, 1960, Ser. No. 16,612
Claims priority, application Germany Mar. 20, 1959
5 Claims. (Cl. 346—105)

Figure 1:
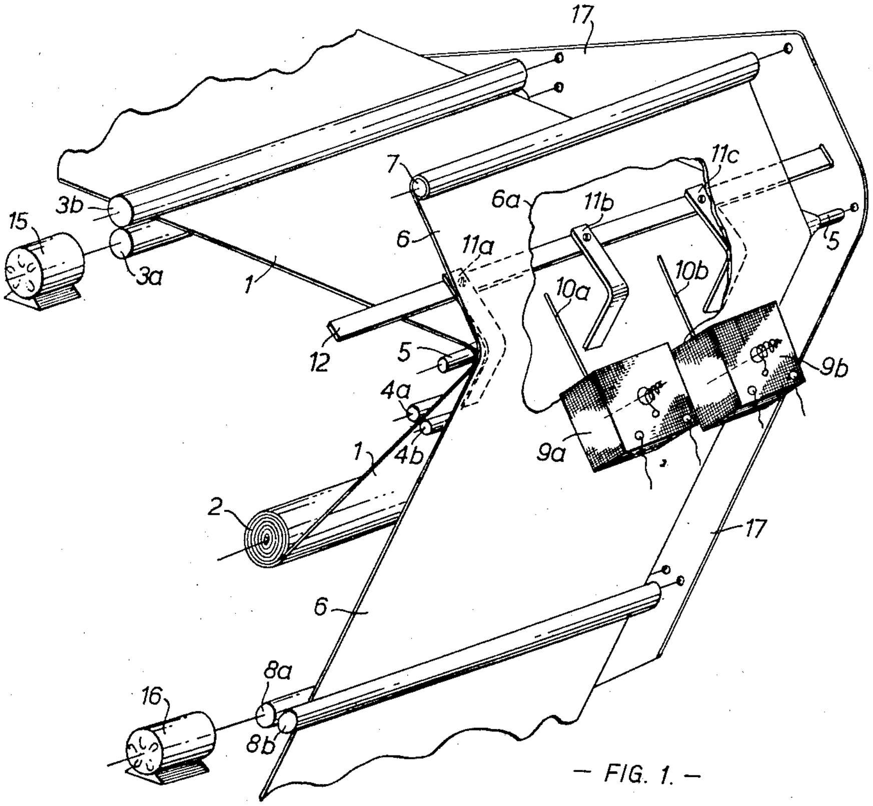

The invention relates to improvements in the directly visible continuous recording of measurement data, such as physical, chemical, physiological and biological data, which vary with time.

The invention is concerned with apparatus in which a color or pigment trace is transferred from a tape-like color or pigment carrier, such as a strip of carbon paper, on to a tape-like record carrier by means of a recording arm deflected by a measuring instrument. Such apparatus is used particularly for recording measurement data fluctuations of comparatively high frequencies in rectangular co-ordinates, a straight edge or thin roller being disposed at a recording station as a recording base across which the record carrier is traversed and across which the pigment carrier with the pigment layer facing the record carrier is also traversed preferably in a different or opposite direction. A pigment tracing is produced on the record carrier under the action of the frictional contact and slight pressure between the record and pigment carrier at the pressure point of the recording arm, which swings along the recording base responsively to measurement data fluctuations.

A condition for the production of a neat clear recorded trace is the exclusive transference of pigment at the pressure point of the recording arm, even when the pigment carrier and record carrier are intended to pass through the recording station of the apparatus at relatively different speeds and/or directions in order to ensure, by the relative friction therebetween, an abundant pigment transference increasing the pigment intensity of the recorded tracing. To fulfil this condition it is important that, at all points along the recording base not subjected to the pressure of the recording arm, a residual, even if only small, minimum clearance should remain between the record carrier and the pigment carrier. This clearance should be capable of being eliminated and re-established only by the recording arm at the place of contact with the pigment carrier so that at no point along the base other than at the pressure point of a recording arm is pigment transferred to the record carrier. For this reason it has hitherto been necessary, in order to obtain a sharp trace, to guide the pigment carrier in a highly tensioned state across the recording base, because only then was the correct adjustment of the most favorable clearance possible, and also to provide the record arm with a slight curvature in a plane perpendicular to the recording base, so that said arm can come into contact with the pigment carrier only by a convex arc and thus its movement cannot be interrupted or impeded by the tightly tensioned pigment carrier. Since, however, the recording arm executes an arcuate deflection movement, the result of the curvature is that the pressure on the pigment carrier greatly varies with the deflection and consequently also the intensity of the transfer pigment trace, which is undesirable if a uniform record is to be achieved over the entire extent of deflection.

The same requirements are necessary, however, even when the pigment carrier, the record carrier and the record arm are arranged in this order across the recording base.

One object of the present invention is to enable a neat, clear, recorded trace to be produced on the record carrier without the intensity of the trace varying with the deflections thereof.

Another object of the present invention is to enable a neat, clear, recorded trace to be produced without having to highly tension the pigment carrier along a straight path through the recording station.

A further object of the present invention is to provide spacing means at the recording station for positively spacing the pigment carrier from the record carrier, the pressure of the recording arm towards the recording base being sufficient to overcome this clearance only at the point of pressure between the recording arm and the recording base.

Still further objects of the invention will be apparent from the following detailed description when read in conjunction with the accompanying drawings, which serve to illustrate the present invention by way of example only and not to limit the scope of the invention.

Figure 2:
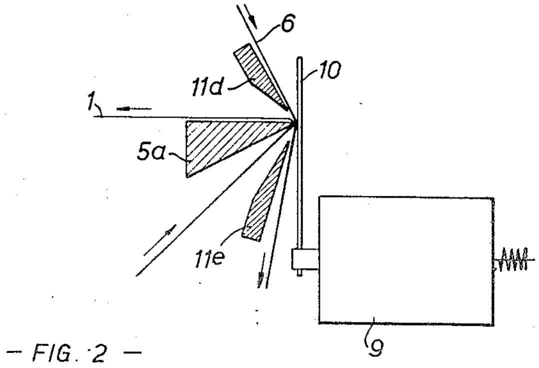

In the drawings:

FIG. 1 is a diagrammatic perspective view of one embodiment of recording apparatus according to the present invention in which angle spacing strips are used as spacing means, FIG. 2 is a diagrammatic cross section of part of recording apparatus according to a second embodiment of the invention in which spacing members are disposed at either side of a recording edge for maintaining the clearance between a record carrier and a pigment carrier.

FIG. 3 is a diagrammatic plan view of a third embodiment of the invention in which spacing strips are arranged differently from the embodiment of FIG. 1, and, FIG. 4 is a diagrammatic cross section of a fourth embodiment of the invention in which a jet of air is used to maintain clearance between the record and pigment carriers.

In recording apparatus of the present invention in which record and pigment carriers are traversed in different directions through a recording station at which a recording base and a recording arm are disposed at opposite sides of the record and pigment carriers, a small minimum clearance is maintained by spacing means between the record and pigment carriers, said clearance only being eliminated by pressure exerted by the recording arm towards the recording base so as to transfer pigment from the pigment carrier to the record carrier to produce a trace thereon. The thickness of the recorded trace is very small compared with the length of the base and does not exceed the thickness of the recording arm. The record and pigment carriers are both guided across the recording base, preferably in the form of a sharp edge or a slim roller, through an angle, that of said record carrier preferably being acute.

A predetermined small clearance space is maintained between the record and pigment carriers at the recording station despite the angle or kink through which the pigment carrier is bent, for example, by thin narrow spacing strips disposed at the two edges of the pigment carrier. If two measuring instruments and recording arms are used simultaneously side-by-side with the one record carrier and the one pigment carrier then a further spacing strip is preferably arranged between the other two. The spacing strips can be supported from a bridge or bar or can remain in place on their own due to their special angular shape and the choice of suitable relative traversing speeds of the record and pigment carriers, bearing in mind that the pigmented face of the pigment carrier exerts much greater friction forces on the spacing strips than the record carrier.

In another arrangement of the invention spacing members are arranged at either side of the recording base and in a further arrangement a jet of air is blown between the record and pigment carrier to maintain the predetermined clearance.

Referring now to FIG. 1 of the drawings, recording apparatus for continuous directly visible dry recording utilizes a tape-like record carrier 1 which is unwound from a supply roll 2. A recording base is disposed at a recording station in the apparatus and in the embodiment of FIG. 1 comprises a slim cylinder or roller producing a narrow edge across which the record carrier is traversed preferably at an acute angle. A pair of rollers 3*a*, 3*b*, which are driven by the motor 15 and are located after the recording station in the unwinding direction of the record carrier, serves to drive the record carrier at a selected predetermined rate of speed. Another pair of rollers 4*a*, 4*b*, is required for tightly tensioning the record carrier by braking its movement. Measuring instruments 9*a*, 9*b*, which are preferably in the form of moving iron measuring instruments, convert electrically transmitted measuring impulses into deflection movements of recording arms 10*a*, 10*b* about the axes of the measuring instruments. A pigment carrier 6 is unwound from a supply roll 7 and traversed through the recording station by a pair of driving rollers 8*a*, 8*b* driven by a motor 16.

Hitherto the pigment carrier was highly tensioned in a straight condition between the storage roll and the driving rollers while a recording arm was slightly bent for uninterrupted movement. However in the present invention as exemplified by FIG. 1 the pigment carrier 6 is traversed through an angle as it passes across the recording base due to the positions of the supply roll 7 and the pair of driving rollers 8 relative to the recording base 5 so that the recording edge no longer lies more or less on a straight line between the storage roll 7 and the pair of driving rollers 8*a*, 8*b*. Nevertheless, a necessary minimum space is maintained between the pigment carrier 6 and the record carrier 1 at the recording station by angled spacing means 11*a*, 11*b*, 11*c*, in the form of strips, as seen in FIG. 1, arranged between the pigment carrier and the record carrier at both sides laterally thereof and preferably also in the middle where two traces are being recorded. The spacing means are fixed to a support 12 so that they are not carried along by the pigment carrier or by the record carrier. The pressure of the recording arm must be sufficient for this minimum space to be eliminated at the pressure point so that functional contact with the record carrier takes place leading to the transference thereto of the pigment trace. FIG. 1 also shows one of the side walls 17 of the apparatus in which the various supply rolls, driving and braking rollers, the roller 5 forming the recording base, the support 12 for the spacing strips 11*a*, 11*b*, 11*c*, and other components (not shown) are journalled or otherwise positioned. The front side wall is not shown.

In the arrangement of recording apparatus shown in FIG. 2, a record carrier 1 is traversed through an arcuate angle about a sharp edge of a recording base in the form of a prism 5*a*. A pigment carrier 6 is traversed through the recording station in the opposite direction to the record carrier. As in the embodiment of FIG. 1 driving rollers and supply rolls will be included but these are not shown in FIG. 2. The recording arm 10 of a recording instrument 9 cooperates with the sharp edge of the prism 5*a* to produce a recorded trace in the usual way.

The spacing means according to the present invention, as exemplified in FIG. 2, comprises two prism members 11*d*, 11*e* arranged parallel to and at each side of the recording base. The members 11*d* and 11*e* are close to the recording edge 5*a* and the necessary space between the pigment carrier 6 and the record carrier 1 is obtained merely by the inherent stiffness of the pigment carrier. In this embodiment the spacing members 11*d* and 11*e* extend the entire width of the recording edge without interrupting the transfer of the pigment trace.

FIG. 3 is an elevation from above of part of recording apparatus which like the apparatus of FIG. 1 is adapted to produce two recorded traces on the record carrier. The record carrier 1 is traversed through the recording station by means not shown across a sharp edge of a recording base in the form of a prism 5*a* similar to that shown in FIG. 2. A pigment carrier 6 which is only shown in cross section in FIG. 3 is also traversed through the recording station. Recording arms 10*a* and 10*b* of measuring instrument 9*a* and 9*b* cooperate with the sharp edge of the prism 5*a* to produce the recorded traces.

In order to maintain a predetermined minimum clearance space between the record and pigment carriers spacing strips 11*f* and 11*g* extend between the two edges of the record and pigment carriers and a further spacing strip 11*h* is arranged in the middle of the record and pigment carriers in a similar manner to the spacing strip 11*b* shown in FIG. 1. The recording arms 10*a* and 10*b* exert sufficient pressure towards the recording base to overcome this clearance at the point of pressure only.

The spacing strips 11*a*, 11*b*, 11*c* of the apparatus of FIG. 1 and the spacing strips 11*f*, 11*g*, 11*h* preferably have a width of 0.5 to 2 mm. and a thickness, corresponding to the desired minimum clearance between record carrier and pigment carrier, of preferably only fractions of a millimetre up to 1 mm. The spacing strips and also the guide members 11*f*, 11*g* of FIG. 4 may consist of inherently rigid but slightly elastically flexible metal or plastic strips.

In a preferred embodiment of the invention (not shown) it is not necessary to attach the spacing members 11*a*, 11*b*, 11*c* to a support 12 if their friction with the inherently smooth surface of the record carrier, on the one hand, and the rough pigmented face of the pigment carrier, on the other hand, is in an inverse ratio to their traversing speeds in opposite directions, which in fact is the case in the successful embodiments, since the traversing speed of the pigment carrier is much less than that of the record carrier, but the friction on the pigment layer is however very great. The spacing means may be formed in the pigment or record carrier itself.

In the drawings, the thickness of the spaces formed by the spacing means between the pigment and record carriers is shown greatly magnified so that the pigment carrier 6 appears very arched at the pressure point of the recording arms a fact which in reality is not the case. In practice, the strip of pigment carrier can be brought into contact with the record carrier 1 even quite close to the guiding means by the slight pressure of the recording arms and a good recorded tracing is produced.

In the embodiment of recording apparatus illustrated in cross section in FIG. 4, like the recording apparatus of FIG. 1, a record carrier 1 is traversed through a recording station by driving rollers 3*a*, 3*b* driven by a motor (not shown in FIG. 4). The record carrier is supplied from a supply roll 2 and is tensioned by braking rollers 4*a*, 4*b*. A pigment carrier 6 is supplied from the supply roll 7 and is traversed through the recording station by driving rollers 8*a*, 8*b* driven by a motor (also not shown). In the embodiment of FIG. 4 as in the embodiments of FIGS. 2 and 3, the recording base is in the form of a prism 5*a* which has a sharp edge extending transversely to the path of the record carrier 1. A recording arm 10 of a measuring instrument 9 cooperates with this sharp edge to produce a recorded trace on the record carrier in the manner previously described.

In the embodiment shown in FIG. 4, a jet of air is blown through a long narrow slit-like nozzle 13 mounted longitudinally of and adjacent to the recording base 5*a* and having a long narrow outlet, parallel to the recording base, between the record carrier 1 and the pigment carrier 6 so that a small space is maintained between the two carriers except at the pressure point of the recording arm 10. The air current can be produced by means of a small fan 14 fitted in the apparatus. Below the issuing portion of the pigment carrier 6, a base 14 can be provided to prevent sagging of the pigment carrier 6. Vibrations of the pigment carrier, easily occurring in this method, can be damped by various measures such as by yielding cushions or buffers in order to stabilise the position of the kink in the pigment carrier.

By means of the features proposed by the invention, such as an extensive improvement of the dry recording method is possible that even measurement data fluctuations which occur with frequencies of several hundred cycles per second and comparatively large amplitudes, can be recorded with practically constant quality and clarity directly visible on a paper strip which, according to the frequencies to be recorded passes through the recording mechanism at various speeds of for example 1 to 5 cm./sec.

The features proposed in accordance with the present invention may be employed in a similar manner in the case of recording apparatus having the reverse arrangement of the tape-like record carrier and of the likewise tape-like color or pigment carrier. In this case the pigment carrier, with its layer of pigment on the outside, is traversed with a kink directly over the recording base and reversed thereon, while the record carrier, by means of the proposed lateral or interposed spacing means passes between the recording arm and the color or pigment carrier with the formation of a kink and the maintenance of a small minimum clearance from the pigment carrier at the points not under pressure from the recording arm. In this case, precisely the same conditions apply to the shape and function of the recording arm as described above.

We claim:

1. Recording apparatus comprising means providing a linear support along which a recording operation can be effected, a record carrier, a pigment carrier, one of said carriers engaging said support by traversing an angular path having an apex at said support, the other of said carriers traversing an angular path having an apex adjacent said support and spaced from the first said apex, the latter said path defining a greater angle than the first said path and both said paths defining angles substantially less than one hundred and eighty degrees, driving means for driving said carriers along said paths at different relative speeds, spacing means for maintaining a spacing between said carriers at said apices, and a recording arm disposed substantially transversely of said support and adapted for urging said carriers against said support at said apices.

2. Apparatus as claimed in claim 1 wherein said spacing means includes angled spacing members between said carriers at said support.

3. Apparatus as claimed in claim 1 wherein said spacing means includes prism members between said carriers on opposite sides of said support, said members being spaced from the support to avoid interference with the operation of said arm.

4. Apparatus as claimed in claim 1 wherein said spacing means includes means for directing an air jet between the carriers at said support.

5. Apparatus as claimed in claim 1 wherein said arm is rectilinear.

References Cited in the file of this patent

UNITED STATES PATENTS

| | | |
|---|---|---|
| 1,129,114 | Norwood et al. | Feb. 23, 1915 |
| 1,564,560 | Grisdale | Dec. 8, 1925 |
| 2,139,508 | Marcellus | Dec. 6, 1938 |
| 2,246,003 | Rich | June 17, 1941 |
| 2,703,269 | Wood | Mar. 1, 1955 |

FOREIGN PATENTS

| | | |
|---|---|---|
| 1,113,100 | France | Nov. 28, 1955 |